United States Patent [19]

Kellenberger et al.

[11] Patent Number: 5,526,376
[45] Date of Patent: Jun. 11, 1996

[54] INTELLIGENT REPEATER INTERFACE

[76] Inventors: Jane A. Kellenberger, 191 Juniper La., Bloomingdale, Ill. 60108; Lynn Monica, 2630 N. Magnolia, Chicago, Ill. 60614; Mark L. Shaughnessy, 1242 Victoria Ct., Algonquin, Ill. 60102

[21] Appl. No.: 985,378

[22] Filed: Dec. 4, 1992

Related U.S. Application Data

[63] Continuation-in-part of Ser. No. 905,925, Jun. 29, 1992.

[51] Int. Cl.⁶ .............................. H04B 3/36; H04L 25/20; H04L 25/52
[52] U.S. Cl. .................. 375/211; 375/219; 455/16; 455/54.2
[58] Field of Search ................. 375/3.7, 107, 211, 375/219, 356; 455/49.1, 78, 73, 88, 16, 34.1, 34.2, 16, 53.1, 54.1, 54.2; 370/58.3; 379/207, 220, 221, 22

[56] References Cited

U.S. PATENT DOCUMENTS

| | | | |
|---|---|---|---|
| 4,553,262 | 11/1985 | Coe | 455/54.2 |
| 4,570,261 | 2/1986 | Maher | 371/16 |
| 4,835,731 | 5/1989 | Nazarenko et al. | 379/63 |
| 4,905,302 | 2/1990 | Childress et al. | 455/34.1 |
| 4,939,746 | 7/1990 | Childress | 455/33 |
| 5,133,080 | 7/1992 | Borras | 455/34.1 |
| 5,168,575 | 12/1992 | Cizck et al. | 455/15 |
| 5,212,832 | 5/1993 | Ness-Cohn | 455/54.1 |
| 5,228,038 | 7/1993 | Jestice et al. | 455/53.1 |
| 5,257,406 | 10/1993 | Ito | 455/54.1 |
| 5,276,911 | 1/1994 | Levine et al. | 455/53.1 |

OTHER PUBLICATIONS

E. F. Johnson Clearchannel Ltr Appliation Note, Fifth Printing, Oct. 1988.

*Primary Examiner*—Stephen Chin
*Assistant Examiner*—Tesfaldet Bocure
*Attorney, Agent, or Firm*—Susan L. Lukasik

[57] ABSTRACT

An intelligent repeater interface (101) connected to a non-intelligent repeater (102) is used to control trunked communications at a trunked communication site in a trunked communications system. The intelligent repeater interface (101) signal processes radio frequency signals received by or transmitted from a non-intelligent repeater. The intelligent repeater interface (101) also processes and stores control information. The control information and processed signals are interfaced (108, 109, and 110) directly to an external communication network (111, 112, and 113), without use of a separate central controller for the trunked communication site or system and without replacing the non-intelligent repeater with an intelligent repeater.

17 Claims, 4 Drawing Sheets

INTELLIGENT REPEATER INTERFACE

This is a continuation-in-part of application Ser. No. 07/905,925, filed Jun. 29, 1992.

FIELD OF THE INVENTION

This invention relates to trunked communication systems, including but not limited to repeater control in a trunked communication systems. Reference is made to U.S. patent application Ser. No. 07/905,925, titled "Intelligent Repeater for Trunked Communications," filed Jun. 29, 1992, on behalf of Lynn M. Monica et al., with the same assignee as the present invention.

BACKGROUND OF THE INVENTION

Trunked communication systems are known to comprise a plurality of communication units, a limited number of communication resources that are transceived via a predetermined number of repeaters, or base stations, and a communication resource allocator that allocates the limited number of communication resources among the plurality of communication units. The communication units may be portable radios and/or mobile radios. The communication resources may comprise a TDM (time-division multiplexed) bus, telephone lines, a carrier frequency, a pair of carrier frequencies, or any RF (radio frequency) transmission means.

Generally, trunked two-way communication systems provide mobile and portable communication units with wireless services similar to many wired communication networks. Such examples include full-duplex telephone voice communication, two-way mobile-to-mobile group dispatch communication, and two-way mobile-to-dispatcher group dispatch communication. A typical trunked communication system site, where each different site has a different physical location, is composed of a number of full-duplex repeaters, each coupled to a variety of devices to support interconnection to the public telephone network, mobile-to-mobile calling, and to one or more dispatcher console positions. These devices typically provide a centralized control for the repeaters. For example, a single central controller provides radio channel signaling encode and decode functions, authorization functions, resource determination functions, and communication activity logging for multiple repeater resources. A single telephone interconnect switch typically provides the repeaters with an interface to one or more telephone lines to support telephone interconnect communication. In systems employing a single device that is shared among the repeaters, a failure of the single device may render one or more of the desired services or functions inoperable, thus impairing communications in the system.

One method of overcoming a single central controller problem is to eliminate the use of a single central controller and use intelligent repeaters that process and store control information, interface directly to external communication networks, and distribute the needed system functions throughout the intelligent repeaters. Although such a system has many advantages over a system utilizing a single central controller, it would be expensive to replace all of the current non-intelligent repeaters with intelligent repeaters, particularly if the non-intelligent repeaters are relatively new or have many useful years remaining.

Therefore, a method of providing centralized control of non-intelligent repeaters without a central controller is desired.

DESCRIPTION OF A PREFERRED EMBODIMENT

The following describes a method and apparatus that enables continuous service in a trunked communication system by eliminating the dependence on single shared devices for system control. Each of a plurality of repeaters is equipped with an arrangement of components that uniquely distribute these service functions. The functions of radio channel signaling encode and decode functions, authorization functions, resource determination functions, and communication activity logging are distributed among the repeaters such that function placement adaptation insures continued service operation.

Figure 1:
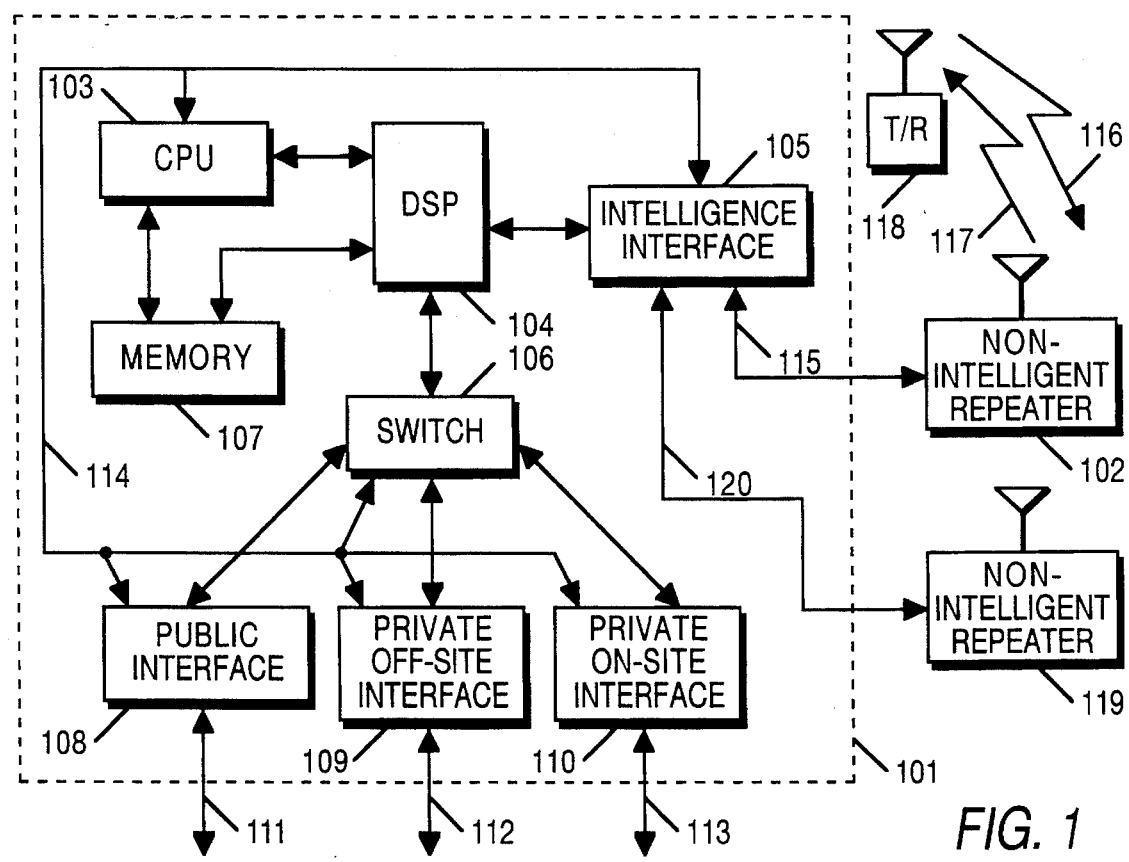
FIG. 1 is a block diagram of an intelligent repeater interface for a non-intelligent repeater in a trunked communication system in accordance with the invention.

A block diagram of an intelligent repeater interface for a non-intelligent repeater in a trunked communication system is shown in FIG. 1. The combination of an intelligent repeater interface 101 and a non-intelligent repeater 102 interact with a communication unit 118 with radio frequency (RF) signals 116 and 117. In the preferred embodiment, the intelligent repeater interface 101 includes a signal processor 104, a central processing unit (CPU) 103, memory 107 for storage of information, and a switch 106. Also included are interfaces for interfacing control information and processed signals directly to an external communication network. These interfaces include, for example, a public interface 108 and 111, a private off-site interface 109 and 112, and a private on-site interface 110 and 113. In the alternative, two or more non-intelligent repeaters 102 and 119 may be attached to the intelligence interface 105.

RF signals 116 transmitted by a communication unit 118 are received by the receiver of a conventional non-intelligent repeater 102 through its receive antenna. These transmissions may be modulated using a variety of techniques known in the art, such as, frequency modulation (FM), amplitude modulation (AM), or a combination of the two. Further, the signals carried by the modulation may be frequency and/or time division multiplexed. After reception, the signals are transferred via the signal/control interconnect 115 to an intelligence interface 105 within the intelligent repeater interface 101. The received signals are buffered and/or multiplexed as necessary in the intelligence interface 105, digitized if necessary, and sent on to the signal processor 104, which may be a digital signal processor or DSP (e.g., a DSP56001 available from Motorola, Inc.), for further decoding and processing. Control information is extracted from the signal and transferred to the CPU 103, which may be a microprocessor (e.g., an MC68302 microprocessor available from Motorola, Inc.). Other information present in the signal such as voice, images, and user data are transferred to the switch 106, which may be a cross-point matrix, time slot interchanger, or multiple-access packet link for routing. The switch provides a means to transfer control signals and information signals between the radio channel, the public network, the private off-site network, and the private on-site local area network (LAN). The other information may also be transferred, if necessary, to memory 107, which may be random access memory (RAM), for temporary storage.

Control information generated by the non-intelligent repeater, that is, control information not embedded in the received signal, is also routed via signal/control interconnect 115 to the intelligence interface 105 in the intelligent repeater interface 101. The control information from the non-intelligent repeater typically contains information about the receiver and transmitter status. For example, it may simply be signal lines that are switched to ground potential whenever the receiver is in an unsquelched condition, when the transmitter is operating at full power, or it may contain other information such as received power level, transmit power level, or received signal to noise measurements. The intelligence interface 105 buffers the incoming control information which is then sent, via a control bus 114, to the CPU 103 for processing.

Control information that is embedded with the received signal is extracted by the signal processor 104 and delivered to the CPU 103. This embedded control information may contain such things as the communication unit's individual and group identifications (IDs), and type of service requested. The CPU 103 uses this information in a manner described in FIG. 3, FIG. 4, and FIG. 5 to allocate resources and communicate with other system elements in order to appropriately serve the communication unit 118. The memory 107 is also used by the CPU 103 during the normal course of its processing to store and retrieve control information and program steps, as those represented in FIG. 3, FIG. 4, FIG. 5, system database information, and any dynamic parameters needed during program execution.

The switch 106, under control of the CPU 103, routes information from the signal processor 104 to one or more of the interfaces 108, 109, and 110. The content of the signal information and the configuration of the external network(s) determine to which interface(s) the information is routed. The public interface 108, if needed, is connected to one or more of many different public networks 111. The public interface 108 may be a standard telephone subscriber loop line, or it may be a standard data network line, such as one from an X.25 standard public packet data network. The private off-site interface 109, if needed, is typically connected to a private communications network 112 that is used to connect other sites of a multi-site radio network. The private off-site network 112 may be constructed of 4-wire analog lines, time division multiplex carriers, packet data links, and so forth. The private on-site interface 110 is connected to a LAN 113 that forms a communication link shared by other intelligent repeaters and intelligent repeater interfaces connected to non-intelligent repeaters of the system that are located at the same communication site, i.e., the same physical space where the intelligent repeaters and the intelligent repeater interfaces and their associated non-intelligent repeaters are located. The LAN 113 that the private on-site interface 110 is connected to may be a standard LAN, such as a LocalTalk LAN, an Ethernet LAN, or an FDDI (Fiber-Optic Distribution Data Interconnect) LAN.

The switch 106 is also used to route information that flows into the intelligent repeater interface 101 from the interfaces 108, 109, and 110, to the signal processor 104. These signals are then processed by the signal processor 104 where any embedded control information needed by the trunking system is added. This embedded control information may include filtered subaudible data or any other form of interleaved data that is used by the communication unit 118. These processed signals are then transferred to the intelligence interface 105, where they are buffered and transferred to the non-intelligent repeater 102 via signal/control interconnect 115 and subsequently transmitted to the communication unit 118 using the non-intelligent repeater's transmit antenna. The RF signal 117 that is transmitted to the communication unit 118 may be modulated using any of the modulation techniques described above.

The non-intelligent repeater 102 also receives control information from the intelligent repeater interface 101 via the signal/control interconnect 115. This control information typically contains information used to control various aspects of the non-intelligent repeater 102 such as Push-to-Talk (PTT), transmitter mute, control channel indication, and so forth. This control information originates from the CPU 103 and is transferred to the intelligence interface 105 via the control bus 114, where it is buffered and transferred to the non-intelligent repeater 102 through signal/control interconnect 115. This control information, like the control information that is originated by the non-intelligent repeater 102, may be activated by a simple connection to ground potential, or it may be a serial or parallel data stream that may carry information such as desired transmit power level, allowable inbound private line tone frequencies, and so forth.

Some signals to and from the interfaces 108, 109, and 110 may be transferred directly between the interfaces 108, 109, and 110 as well as the CPU 103 using a control bus 114, which may be a multi-drop parallel data bus, serial data bus, or a time division multiplexed parallel or serial bus. In the preferred embodiment, each of the interfaces 105, 108, 109, and 110 contains a microprocessor (e.g., an MC68302 microprocessor) that monitors the signal flow and determines whether the signals should be transferred to the CPU 103 or to the signal processor 104 via the switch 106.

Figure 2:
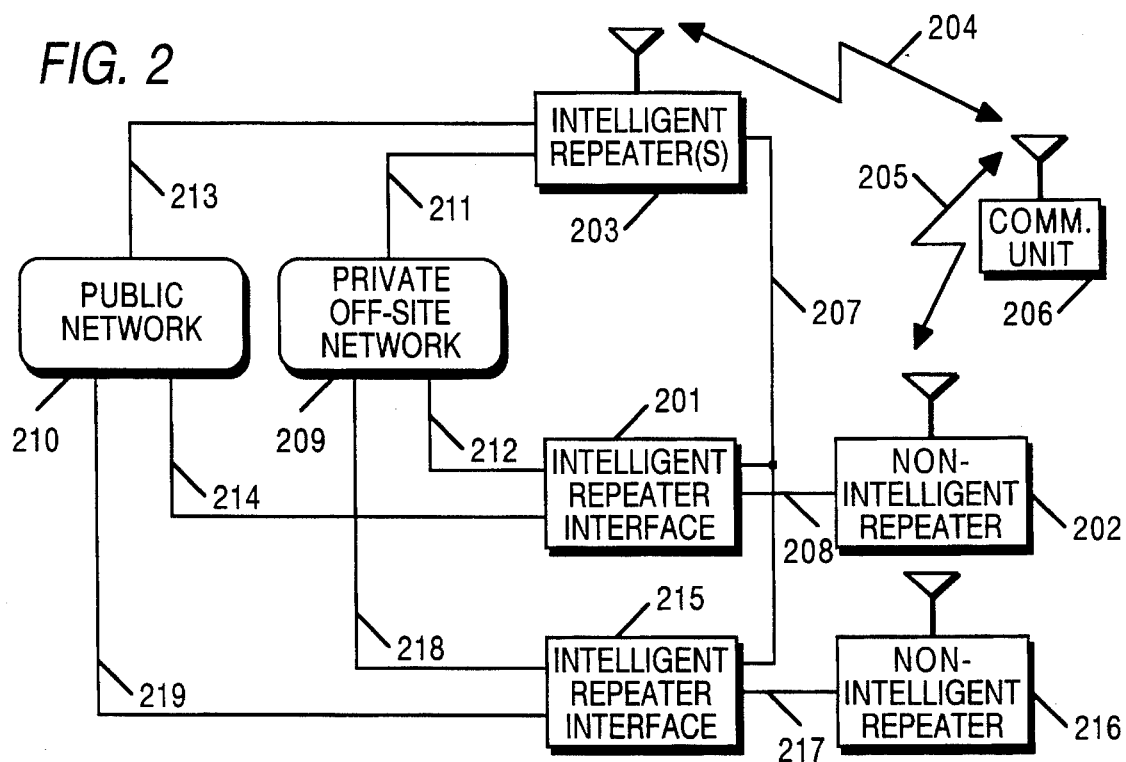
FIG. 2 is a diagram of an intelligent repeater and a non-intelligent repeater with an intelligent repeater interface in a trunked communication system with public network and private off-site network interfaces in accordance with the invention.

A diagram of one or more intelligent repeaters 203 and non-intelligent repeaters 202 and 216 with intelligent repeater interfaces 201 and 215 in a trunked communication system with public network 210 and private off-site network 209 interfaces is shown in FIG. 2. In a trunked radio system, there may be one or more intelligent repeaters 203 and/or combinations of intelligent repeater interfaces 201 and 215, as shown by reference numeral 101 in FIG. 1, and non-intelligent repeaters 202 and 216 located at one or more physical locations or sites. A single system may use any combination of intelligent repeaters 203 and intelligent repeater interfaces 201 and 215 with non-intelligent repeaters 202 and 216, including exclusively intelligent repeaters or exclusively intelligent repeater interfaces 201 with non-intelligent repeaters 202 and 216. The number of intelligent repeaters 203 or controlled non-intelligent repeaters 202 and 216 needed per location is based on the required capacity of the sum of the interfaces provided in terms of radio channel and external network interfaces. The locations of sites are chosen based on the desired RF coverage of a particular geographical area. Although the system may contain many of each, one or more intelligent repeaters 203, two intelligent repeater interfaces 201 and 215 with non-intelligent repeaters 202 and 215, and two communication unit 206 are shown in FIG. 2 for the sake of simplicity of the drawing. For simplicity of narration in the remainder of this description, whenever an intelligent repeater interface is referred to, it will be assumed that a non-intelligent repeater is connected to that intelligent repeater interface.

Communication between the intelligent repeaters 203 and intelligent repeater interfaces 201 is necessary to enable the system's repeaters to operate in concert to provide consistent services. This communication is provided by assigning each component of the call establishment process to the communication units 206, because those units roam throughout the RF coverage area. For example, at a particular site, a specific intelligent repeater 203 or intelligent repeater interface 201 may be dedicated to transceiving control information to and from the communication units 206. This particular repeater is considered to provide the "control channel," a term well known in the art. Other intelligent repeaters 203 or intelligent repeater interfaces 201 may be present at the site to be used for transceiving the typical voice, data, or image messages to and from the communication units 206. When a communication unit 206 makes a request for service on the control channel, that information is passed via the private on-site network 207 to the other intelligent repeaters 203 and intelligent repeater interfaces 201 and 215 at the site for request authentication and appropriate resource allocation in accordance with the methods described below. As a second example, when a communication unit 206 roams from the coverage area of one site into the coverage area of another, information is passed via the private off-site network 209 using communication links 211 and 212 such that appropriate resources may be placed into service at the new site, while the resources that were in service at the old site are deactivated. As a third example, a communication unit 206 may request a telephone interconnect call. To connect this type of service to the communication unit 206, the intelligent repeater 203 or intelligent repeater interface 201 that is transceiving the communication unit's RF signals 204 and 205 is typically connected directly into the public telephone network 210 via a standard telephone line 213 or 214.

Figure 3:
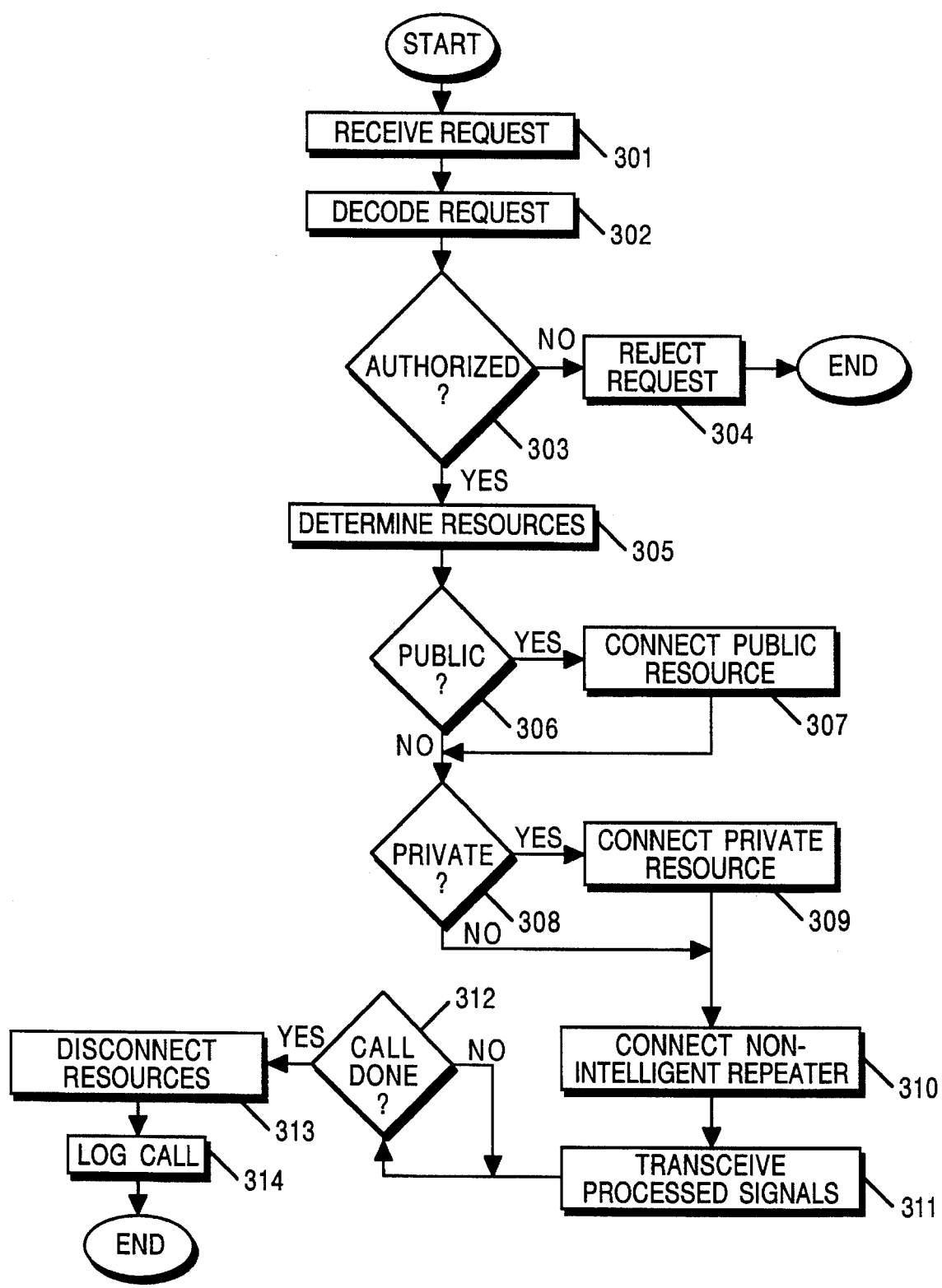
FIG. 3 is a flowchart showing operation of a trunked communications system using a non-intelligent repeater with an intelligent repeater interface in accordance with the invention.

A flowchart depicting operation of a trunked communications system using a single intelligent repeater interface connected to a non-intelligent repeater is shown in FIG. 3. The non-intelligent repeater 102 receives a request for service 116 from a communication unit 118 and transfers it directly to the intelligent repeater interface 101 at step 301. The intelligent repeater interface 101 decodes the request at step 302 using the signal processor 104 and CPU 103 to determine what type of service is required by the communication unit. The request is authorized at step 303 by scanning a list stored in memory and comparing the ID of the communication unit sourcing the resource request to the stored list, which is a predetermined list of authorized IDs and the resources each ID may access, as different communication units may be authorized to use only certain communication resources. If the communication unit that sourced the request is not authorized for the requested communication resource, the request is rejected at step 304, which entails transmitting a rejection message to the requesting communication unit, and the processing ends for this call request.

If at step 303 the communication unit that sourced the request is authorized to use the requested communication resources, the appropriate resources needed to service the request are determined at step 305. If at step 306 the resource required is a public resource, the public interface is connected to the public resource via the switch 106 at step 307. If at step 308 the resource required is a private off-site resource, the private off-site interface is connected via the switch 106 at step 309. The non-intelligent repeater 102, operably coupled to the intelligence interface 105, which is in turn operably coupled to the signal processor 104, is also connected via the switch 106 at step 310, and processed signals are transferred between the communication unit and the requested resources, thus communications occur.

These connections remain until the completion of the call at step 312, when the resources are disconnected at step 313 by deactivating the interfaces and stopping the transfer of processed signals through the switch 106. The call is logged at step 314 by storing information such as the communication unit's individual and/or talkgroup IDs, the duration of the call, and the types of resources used.

Figure 4:
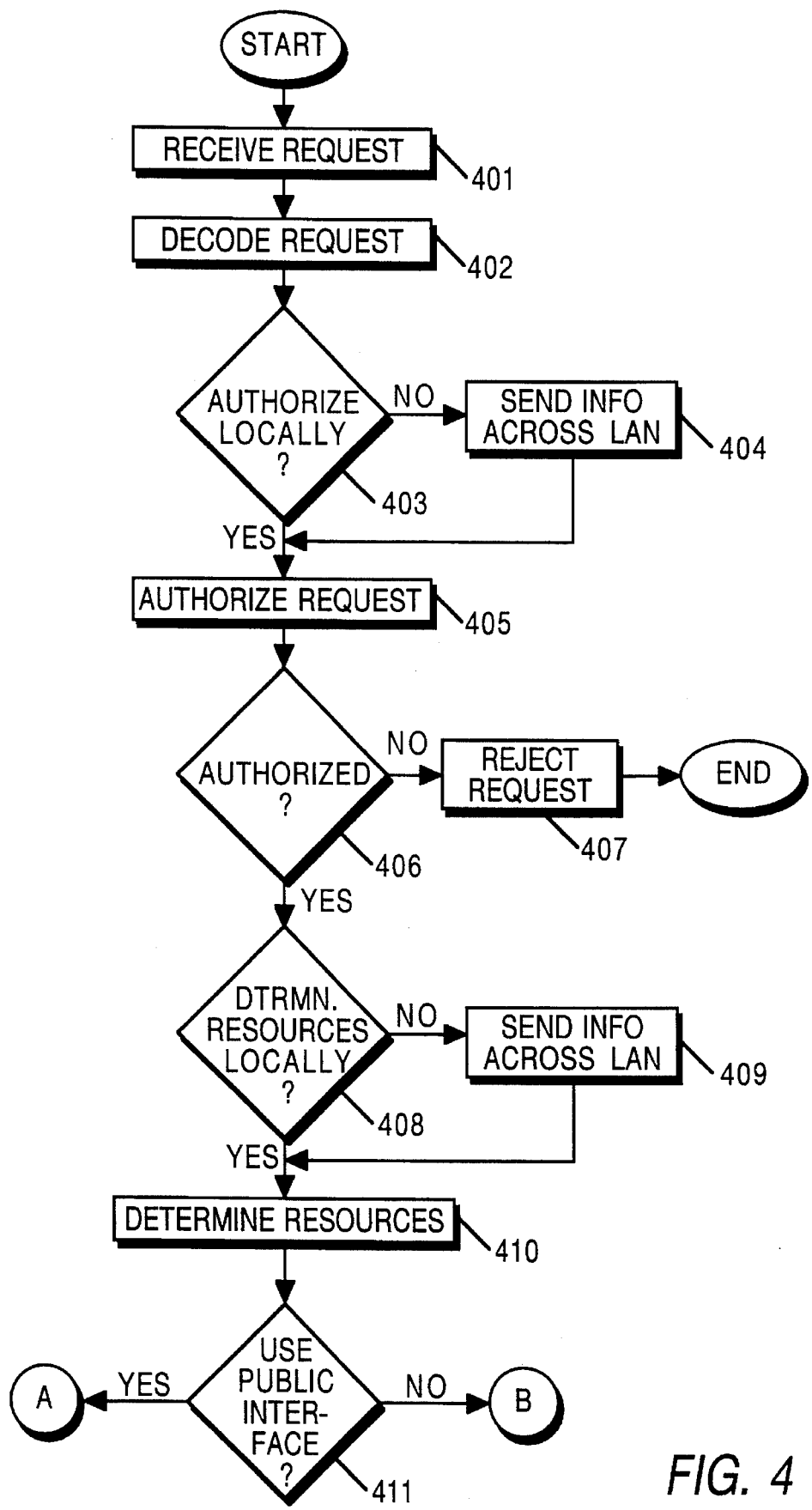
FIG. 4 and FIG. 5 depict a flowchart showing operation of a trunked communications system using multiple intelligent repeaters and/or non-intelligent repeaters with intelligent repeater interfaces in accordance with the invention.
Figure 5:
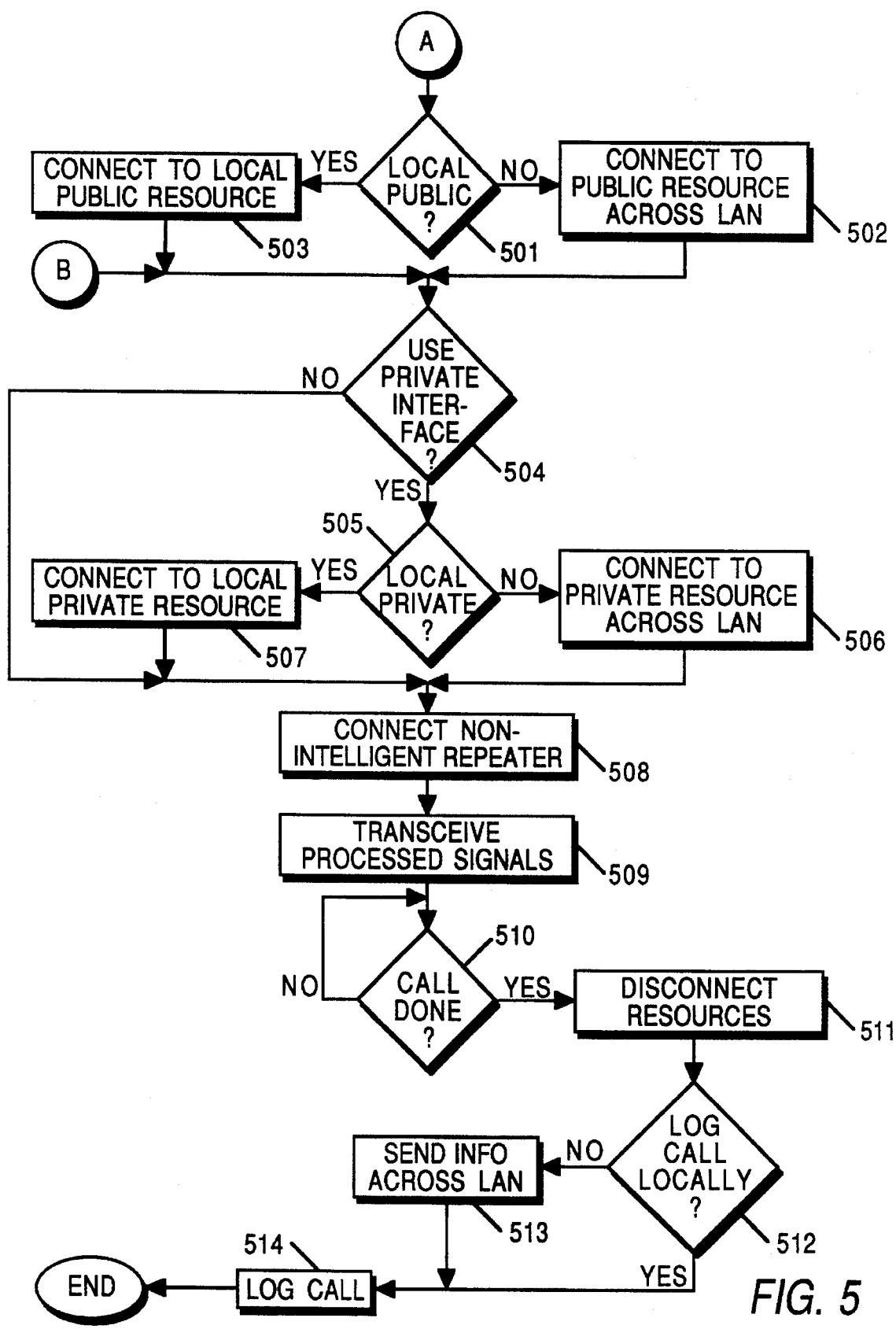

A flowchart depicting operation of a trunked communications system using multiple intelligent repeaters and/or intelligent repeater interfaces at a trunked communication site is shown in FIG. 4 and FIG. 5. Because an intelligent repeater interface connected to a non-intelligent repeater is intended to provide the same functions within a system as an intelligent repeater, an intelligent repeater may be substituted for an intelligent repeater interface connected to a non-intelligent repeater without loss of system function. For simplicity of narration, the description for FIG. 4 and FIG. 5 is written with the assumption that the particular site described within the system is comprised entirely of intelligent repeater interfaces connected to non-intelligent repeaters.

An intelligent repeater interface 101 supporting control channel communications, where resource requests are received from communications units and resource grants and transmitted in response, receives a resource request sourced by a communication unit at step 401. In the preferred embodiment, the communication unit 118 encodes the information in the resource request with an error control coding method to provide reliable operation in the RF environment. The intelligent repeater interface 101 supporting the control channel operations decodes 402 the information in the requesting transmission. The request information contains an ID of the requesting communication unit 118 and also indicates what type of service is requested.

The present invention enables the distribution of the component tasks of the call establishment process. Accordingly, the intelligent repeater interface supporting the control channel operations decides which of the intelligent repeater interfaces will authorize access for the communication resource request at step 403. Each intelligent repeater interface has a list of which intelligent repeater interface and intelligent repeater is assigned to carry out each component of the call establishment process so that each step is directed to the appropriate entity. The appropriate intelligent repeater interface is either the same intelligent repeater interface, the local choice, or another intelligent repeater interface. If the authorization function is carried out by another of the intelligent repeater interfaces, then the request information is transmitted via the private on-site interface over the site LAN at step 404 to the intelligent repeater interface that will carry out the authorization at step 405. At step 406, the intelligent repeater interface assigned to carry out the authorization compares the identity of the requesting communication unit against a predetermined list of authorized communication unit IDs, as was previously described. If at step 406 the requesting communication unit's ID is not authorized for access, the request is rejected at step 407, which entails transmitting a rejection message to the requesting communication unit, and the process ends for this call request.

If at step 406 the requesting communication unit is authorized for access, the intelligent repeater interface supporting the control channel operations establishes at step 408 which of the intelligent repeater interfaces or intelligent repeaters will determine the required communication resources to fulfill the communication resource request. The appropriate intelligent repeater interface is either the same intelligent repeater interface, the local choice, or another intelligent repeater interface. If the resource determination function is carried out by another of the intelligent repeater interfaces, then, at step 409, the request information is transmitted via the private on-site interface over the site LAN 207 to the intelligent repeater interface that will carry out the resource determination. At step 410, the intelligent repeater interface assigned to carry out the resource determination analyzes what resources are required by looking at the type of service requested and matching it against a predetermined list of resources required for that service and checking if the resource(s) is available for that type of call, and the process continues with step 411. A radio channel resource is chosen to serve the requesting communication unit.

The intelligent repeater interface providing the radio channel resource may also be interconnected to the public telephone network and/or to a private network to establish the desired service. Depending on the availability of the public interface and private off-site interface locally associated with the intelligent repeater interface, the interconnect may be routed through the private on-site interface to the LAN 207 and to another on-site intelligent repeater interface with an available public network or private off-site network resource. In this way, the distributed resources of the plurality of intelligent repeater interfaces and non-intelligent repeaters at the trunked communication site are utilized to maintain communications at all times.

The intelligent repeater interface supporting resource allocation decides whether public and private network resources are to be used, and if so, whether the resources are local or non-local. At step 411, the need for a public resource is considered. If at step 411 the public network is not required, the process continues with step 504 of FIG. 5. If a public interface is required, its local availability is considered at step 501 of FIG. 2. If at step 501 a public interface is not available within the same intelligent repeater interface, then a connection is made at step 502 through the on-site LAN 207 to an on-site intelligent repeater interface with an available public network resource (interface 108). If at step 501 the local public network interface is available, it is connected within the same intelligent repeater interface at step 503, and the process continues with step 504.

At step 504, the need for a private resource is considered. If at step 504 the private network is not required, and the process continues with step 508. If a private interface is required at step 504, its local availability is considered at step 505. If a private interface is not available within the same intelligent repeater interface, then a connection is made at step 506 through the on-site LAN 207 to an on-site intelligent repeater interface with an available private network resource (interface 109). If at step 505 the local private network interface is available, it is connected within the same intelligent repeater interface at step 507.

The network interfaces chosen and assigned are connected at step 508 to the chosen non-intelligent repeater radio resource, such as a frequency-pair channel to complete the requested call which transfers processed signals at step 509. Processed signals may be voice, data, and image information carried in any one of many formats by different physical media. This process then continues with step 510.

The intelligent repeater interface tests to see if the call is done at step 510. When the call is completed, the communication unit transmits a call end signal that is detected and transferred to the intelligent repeater interface that provided the resources. The resources allocated to the call are disconnected by stopping the transfer of processed signals at step 511. At step 512, a decision is made where to log the call activity. Logging typically involves storing key statistics related to the call into the memory of the intelligent repeater. If the intelligent repeater interface that is assigned the logging function is not the intelligent repeater interface that provided the radio link, then the call information is passed to that logging intelligent repeater interface over the on-site LAN 207 at step 513. The call information is logged into the memory of the appropriate intelligent repeater interface at step 514, and the process ends.

A communication system designer may see fit to incorporate additional intelligent repeater interfaces without connection to a non-intelligent repeater in order to gain extra public 108, private off-site 109, and/or private on-site 110 interfaces to maximize the ability to provide communications services to its users. An extra intelligent repeater interface may be provided for redundancy to prevent lost communications. At the other extreme, two or more non-intelligent repeaters may be attached to a single intelligent repeater interface, which then acts as a central controller that provides public and private interfaces.

A network of distributed processing elements operates together when each element has been assigned a particular task(s) related to the overall objective. Thus, call processing functions are distributed amongst a plurality of intelligent repeater interfaces and/or intelligent repeaters. In a trunked communication system site comprised of intelligent repeater interfaces operably coupled to non-intelligent repeaters, each intelligent repeater interface is capable of performing each component, or function, of the call process, e.g., receiving a resource request over the non-intelligent repeater's radio channel, decoding the request, authorizing access, determining the required resources, connecting the resources, and logging the call summary. In the present invention, when a plurality of such intelligent repeater interfaces and non-intelligent repeaters comprise a trunked communication system, the components of the call establishment process may be distributed among the intelligent repeater interfaces that are capable of each component task. Such an arrangement is desired to provide non-stop system operation in the event that one of the intelligent repeater interfaces suffers a partial or complete failure. The assignment of the call components may be carried out such that the combination of the intelligent repeater interfaces and their associated non-intelligent repeaters work efficiently together to provide the desired communication services.

What is claimed is:

1. An intelligent repeater interface comprising:

signal processing means for processing signals from a non-intelligent repeater;

processing means, operatively coupled to said signal processing means, for processing control information;

means, coupled to said processing means for processing control information, for storing said control information; and interfacing means, operatively coupled to said signal processing means, said processing means, and said non-intelligent repeater, for interfacing said stored control information and said processed signals directly to at least one external communication network; and means, operatively coupled to said interfacing means, for distributing call processing functions amongst a plurality of intelligent repeater interfaces and/or intelligent repeaters.

2. The interface for a non-intelligent repeater of claim 1, wherein said external communication network is comprised of a public communication network.

3. The interface for a non-intelligent repeater of claim 1, wherein said external communication network is comprised of a private off-site communication network.

4. The interface for a non-intelligent repeater of claim 1, wherein said external communication network is comprised of a private on-site communication network.

5. The interface for a non-intelligent repeater of claim 1, wherein two or more non-intelligent repeaters are attached to the interfacing means.

6. A method of establishing trunked communications at a trunked communication site comprising the steps off receiving a communication resource request;

sourcing from a first intelligent repeater interface some, but not all, call establishment information necessary to support the communication resource request;

sourcing from either a second intelligent repeater interface or a first intelligent repeater additional call establishment information that is necessary to support the communication resource request, wherein the additional call establishment information is at least partially different than the call establishment information that is sourced by the first intelligent repeater interface; using the call establishment information as sourced by at least the first intelligent repeater interface and either the second intelligent repeater interface or the first intelligent repeater to assign a communication resource in response to the communication resource request.

7. The method of claim 6, wherein the first intelligent repeater interface and either the second intelligent repeater interface or the first intelligent repeater establish a call with one of either a public communication network or a private communication network.

8. The method of claim 6, further comprising the step of transferring processed signals between the first intelligent repeater interface and either the second intelligent repeater interface or the first intelligent repeater.

9. A method of establishing trunked communications at a trunked communication site whereat resides a plurality of intelligent repeater interfaces connected to a plurality of non-intelligent repeaters, comprising the steps of:

receiving a communication resource request;

sourcing from a first intelligent repeater interface some, but not all, call establishment information necessary to support the communication resource request;

selecting a second intelligent repeater interface that is not the first intelligent repeater interface;

sourcing from the second intelligent repeater interface additional call establishment information that is necessary to support the communication resource request wherein the additional call establishment information is at least partially different than the call establishment information that is sourced by the first intelligent repeater interface;

using the call establishment information as sourced by at least the first and second intelligent repeater interfaces to assign a communication resource sourced by one of the plurality of non-intelligent repeaters in response to the communication resource request.

10. The method of claim 9, wherein the first intelligent repeater interface and the second intelligent repeater interface establish a call with one of either a public communication network or a private communication network.

11. The method of claim 9, further comprising the step of transferring processed signals between the first intelligent repeater interface and the second intelligent repeater interface.

12. The method of claim 9, wherein a local area network forms a communication link shared by the plurality of intelligent repeater interfaces through private on-site interfaces.

13. An intelligent repeater interface for a non-intelligent repeater, the intelligent repeater interface comprising:

an interface operably coupled to the non-intelligent repeater; and a call processor operably coupled to the interface, and having at least three selectable modes of operation, wherein:

i) in a first mode of operation, the call processor receives all call establishment information necessary to support a requested radio communication;

ii) in a second mode of operation, the call processor sources some, but not all, of the call establishment information necessary to support a requested radio communication;

iii) in a third mode of operation, the call processor sources all of the call establishment information necessary to support a requested radio communication;

and wherein none of the call establishment information is sourced by the non-intelligent repeater in the first mode of operation, the second mode of operation, or the third mode of operation, and at least some of the call establishment information is received by the non-intelligent repeater in the first mode of operation, the second mode of operation, or the third mode of operation when the non-intelligent repeater is used in the requested radio communication.

14. The intelligent repeater interface of claim 13, wherein at least one intelligent repeater is operatively coupled to the intelligent repeater interface.

15. The intelligent repeater interface of claim 13, further comprising means for interfacing directly to at least one external communication network.

16. A method of distributing functions in a communication system including a plurality of non-intelligent repeaters connected to a plurality of intelligent repeater interfaces, comprising the steps of:

processing signal information;

transferring said processed signal information over an interface between a first intelligent repeater interface and a second intelligent repeater interface; and allocating resources amongst the plurality of intelligent repeater interfaces based at least in part on said processed signal information.

17. The method of claim 16, wherein the communication system also includes at least one intelligent repeater and wherein resources are allocated amongst the plurality of intelligent repeater interfaces and the at least one intelligent repeater.

* * * * *

UNITED STATES PATENT AND TRADEMARK OFFICE
CERTIFICATE OF CORRECTION

PATENT NO. : 5,526,376
DATED : June 11, 1996
INVENTOR(S) : Jane A. Kellenberger, Lynn Monica, and Mark L. Shaughnessy It is certified that error appears in the above-indentified patent and that said Letters Patent is hereby corrected as shown below:

Claim 6, column 9, line 18 "off" should be --of:--.

Signed and Sealed this

Twenty-seventh Day of August, 1996

Attest:

BRUCE LEHMAN

Attesting Officer     Commissioner of Patents and Trademarks